Aug. 25, 1931. M. MOLINARI 1,820,474
TOY VEHICLE
Filed May 14, 1930
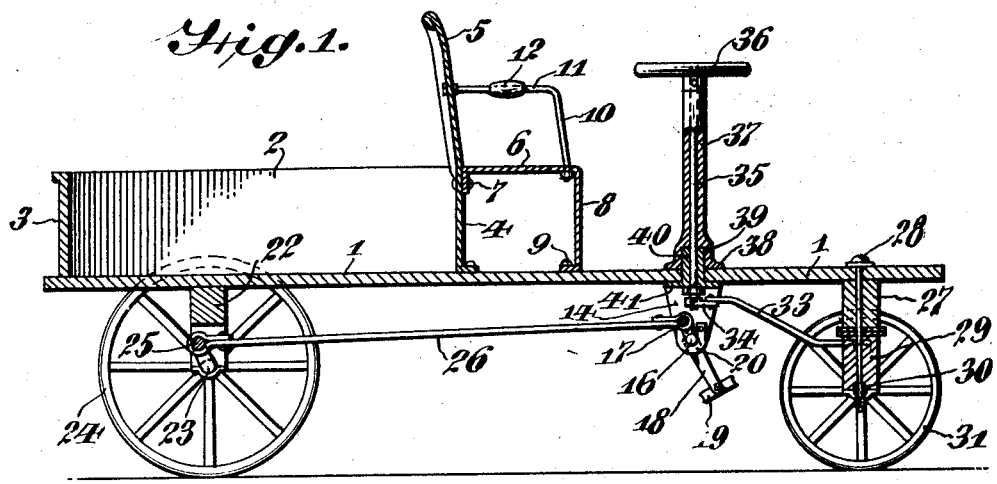
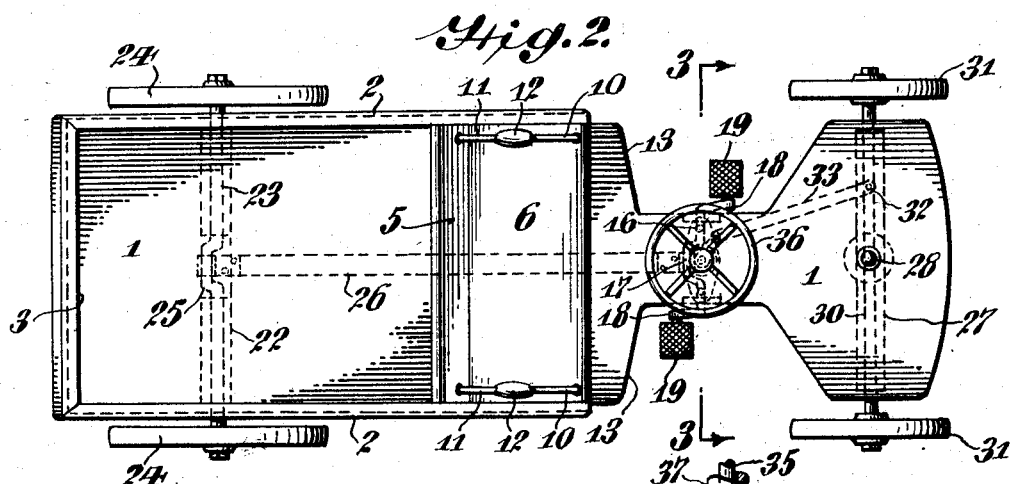
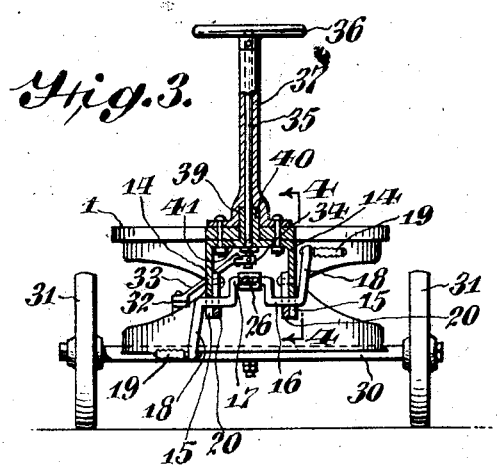
Inventor
Michele Molinari,
By J. Stuart Freeman
Attorney Patented Aug. 25, 1931

1,820,474

UNITED STATES PATENT OFFICE

MICHELE MOLINARI, OF PHILADELPHIA, PENNSYLVANIA

TOY VEHICLE

Application filed May 14, 1930. Serial No. 452,214.

The object of the invention is to provide improved toy vehicles in general, but more particularly in that type in which a child or small person is able to sit and propel the vehicle either forwardly or rearwardly at will.

Another object is to provide in such a vehicle a body portion, one wall of which forms a support for and is extended to form the back of a seat for the occupant and driver.

A further object is to provide in such a vehicle a platform having portions turned downwardly and so cut as to form spaced supports and bearing for a pedal-actuated crank, which is connected by any suitable means to and is operative to drive or rotate the axle upon which the rear wheels are mounted.

Still another object is to provide a novel steering means for altering the angular relation of the forward wheels at will, and to a degree combine this steering mechanism with that portion of the vehicle platform which rotatably supports said pedal-actuated crank.

With these and other objects in mind, the present invention comprises further details of construction and operation, which are fully brought out in the following description, when read in conjunction with the accompanying drawings, in which Fig. 1 is a vertical longitudinal section of a vehicle embodying one form of the invention; Fig. 2 is a top plan view of such vehicle; Fig. 3 is a section on the line 3—3 of Fig. 2; and Fig. 4 is a fragmentary section on the line 4—4 of Fig. 3.

Referring to the drawings, one embodiment of the invention is shown as comprising a platform 1, upon the rear portion of which is mounted a hollow body of any desired size and shape, but in the present instance, comprising oppositely positioned side walls 2, a rear wall 3, and a forward wall 4, which is extended upwardly and slightly rearwardly to form a back 5 of a seat 6. The seat 6 itself comprises a substantially flat member, which at its rear comprises a downwardly extending flange 7, secured to the forward body wall 4, and forwardly depends downwardly to form a supporting portion 8, which at its lower end merges into a flange 9, which bears against the upper surface of said platform. A pair of angle rods or bars are provided as braces, to partially support and maintain a predetermined angular relation between the back 5 and seat 6, each of these rods or bars comprising a forward portion 10 which is secured to said seat, and an upper substantially horizontal portion 11 secured in any desired manner to the back 5, and carrying any desired shape of hand grips 12.

Forward of this seat the platform 1 is provided with cutout portions 13, the material of which is bent downwardly to form spaced parallel flanges or brackets 14, each being provided with a recess 15 which opens downwardly and which recesses are in alignment and cooperate to form bearings for a crank 16, having a central offset portion 17 and angularly disposed terminal portions 18 carrying pedals 19. This crank is operatively secured in the bearing recesses 15 by any suitable means, such for instance as the U-shaped members 20, the upper end portions of which are secured by bolts or rivets 21 to the respectively adjacent flanges or brackets 14.

Supported by and depending from the rear portion of said platform 1 is any suitable bracket 22 for rotatably supporting a transversely extending axle 23, carrying upon its opposite ends driving wheels 24, its central portion being provided with an offset 25 which is rotatably connected with a link or strap 26, the forward end of which latter is in turn rotatably connected with the offset portion 17 of the crank 16. In this manner actuation of the pedals 19 in their respective circular paths effects a rotation of the driving wheels 24 and a consequent propulsion of the vehicle either forwardly or rearwardly as may be desired.

Extending downwardly from the forward portion of said platform is a bracket 27, through which extends a king pin 28, the lower freely extending end portion of which latter carries a member 29 which forms a support for the transversely extending forward axle 30, upon the opposite ends of which are rotatably carried the steering wheels 31.

The member 29, adjacent to one transverse end portion, is pivotally connected at 32 through a link or strap 33 with a radius bar 34, secured in turn to the lower end portion of a steering shaft 35, provided upon its uppermost end portion with a steering wheel 36, which is readily accessible to the driver when normally occupying the seat 6. Obviously, this steering shaft may be inclined rearwardly, instead of extending vertically, if such is desired, and may also be incased within a tube 37, the lower portion of which is enlarged at 38 to form a bearing contact and means for securing the same to the upper surface of the platform 1, while extending into a recess 39 in the lower portion of said tube is a bushing 40, which also extends through the platform, and upon its lower end is provided with a radially enlarged head 41 for securing it to the under surface of the platform.

With this construction there is provided a vehicle which is both inexpensive to construct and efficient in its operation, affording a child a toy vehicle which in reality resembles in many ways a miniature automobile, or similar vehicle for adult use, and it is to be noted that numerous alterations may be made in the details of its structure without departing from the scope of the invention in its broad aspect.

Having thus described my invention, what I claim and desire to protect by Letters Patent of the United States is:—

1. A toy vehicle, comprising a platform having an aperture, a tubular bushing extending through said aperture and having a head secured to the under side of said platform, a steering column extending through said bushing, and a tubular casing surrounding said column and having an enlarged lower end portion containing an enlargement of its bore to receive the free end of said bushing.

2. A toy vehicle, comprising a platform having an aperture, a tubular bushing extending through said aperture and having a head secured to the under side of said platform, a steering column extending through said bushing, a tubular casing surrounding said column and having an enlarged lower end portion containing an enlargement of its bore to receive the free end of said bushing, a radius rod carried by the depending end portion of said column, steering wheels for said vehicle, and a member connecting said rod to said wheels to alter the angular position of the latter in accordance with that of said column.

In testimony whereof I have affixed my signature.

MICHELE MOLINARI.